United States Patent
Miljkovic et al.

(10) Patent No.: US 7,754,263 B2
(45) Date of Patent: Jul. 13, 2010

(54) METHODS FOR COFFEE CHERRY PRODUCTS

(75) Inventors: Dusan Miljkovic, San Diego, CA (US); Brad Duell, Kailua Kona, HI (US); Vukosava Miljkovic, San Diego, CA (US)

(73) Assignee: VDF FutureCeuticals, Inc., Momence, IL (US)

(*) Notice: Subject to any disclaimer, the term of this patent is extended or adjusted under 35 U.S.C. 154(b) by 0 days.

(21) Appl. No.: 12/640,412

(22) Filed: Dec. 17, 2009

(65) Prior Publication Data

US 2010/0080885 A1 Apr. 1, 2010

Related U.S. Application Data

(62) Division of application No. 10/552,944, filed as application No. PCT/US03/11951 on Apr. 16, 2003.

(51) Int. Cl.
*A23F 5/00* (2006.01)
*A23F 3/00* (2006.01)

(52) U.S. Cl. ........... 426/427; 426/429; 426/432; 426/594; 426/597; 426/595; 426/596

(58) Field of Classification Search ............. None
See application file for complete search history.

(56) References Cited

U.S. PATENT DOCUMENTS

| 4,165,752 | A | 8/1979 | Bustamente |
| 6,572,915 | B1 * | 6/2003 | Drunen et al. ............. 426/594 |
| 2002/0187239 | A1 | 12/2002 | Miljkovic et al. |

FOREIGN PATENT DOCUMENTS

FR 1533371 7/1968

OTHER PUBLICATIONS

Sivetz, Michael and Norman W. Desrosier. Coffee Technology. 1979, AVI Publishing Company. pp. 74-82, 86, 127-128.*
EP 1 593, 735 A1 Bodmer et al. Abstract translated. May 7, 2004.*

* cited by examiner

*Primary Examiner*—Jennifer C McNeil
*Assistant Examiner*—Hong Mehta
(74) *Attorney, Agent, or Firm*—Fish & Associates, PC

(57) ABSTRACT

Methods are provided for isolating a nutrient from coffee cherries or for producing a food product that comprises a coffee cherry or portion thereof. It is particularly preferred that coffee cherries will have an extremely low concentration of mycotoxins, including various aflatoxins, fumonisins, ochratoxins, and/or vomitoxin (DON, deoxynivalenol).

19 Claims, 3 Drawing Sheets

* SEC = size exclusion chromatography; HCoffA = coffee polyphenolic acids; CoffA- = coffee polyphenolic acids anion

*SEC = size exclusion chromatography; HCoffA = coffee polyphenolic acids;
CoffA- = coffee polyphenolic acids anion ative, or contrary to the definition of that term provided herein, the definition of that term provided herein applies and the definition of that term in the reference does not apply.

METHODS FOR COFFEE CHERRY PRODUCTS

This application is a divisional application of U.S. application Ser. No. 10/552,944, filed Aug. 9, 2006, which is a US national phase application of PCT/US03/11951, filed Apr. 16, 2003. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is manufacture of food products, and especially food products prepared from whole quick-dried sub-ripe coffee cherries, or fragments/portions thereof.

BACKGROUND OF THE INVENTION

Various parts of the coffee tree have been used for nutritional purposes for a relatively long time (see e.g., Pendergrast, M. *Uncommon Grounds*. Basic Books: New York, 1999). For example, coffee tree leaves and fresh, ripe coffee cherries were boiled to make tea. In other examples, the pulp of the coffee cherry can be fermented to produce wine as described in Chinese Patent CN 1021949. Alternatively, as described by Bustamante (see e.g., U.S. Pat. No. 4,165,752, GB 2026839, and CA 1104410) coffee cherries were compressed, dehydrated, comminuted, and roasted to manufacture a smokable coffee product. A schematic illustration of a coffee cherry is depicted in Prior Art FIG. 1.

In still further well known uses, the seeds (i.e., the beans) of the coffee tree are isolated from the cherry, dried, roasted, ground, and extracted with hot water to provide the beverage that many users enjoy as coffee. Isolation of the coffee beans ("coffee processing") will typically vary depending on the location of the coffee plant, and may be categorized as wet processing or dry processing.

Wet processing is typically employed in relatively humid growing regions at relatively high elevations (e.g., Hawaii, Mexico, Jamaica) and is generally considered to produce higher quality coffees. In contrast, dry processing is normally used in sunny, lower rain regions (e.g., Brazil, Africa, Indonesia) and is considered to produce lower quality coffees, but is simpler and often requires less equipment. Variations of these processes are often used, but will typically fall into the basic classes of wet or dry processing described in the subsequent paragraphs.

In a traditional wet processing method as exemplified in Prior Art FIG. 2A, the pulp is removed from the ripe coffee cherry to give coffee cherry pulp plus mucilage-coated parchment (hull-covered green beans). The mucilage-coated parchment is then fermented in a tank of water, whereby the mucilage loosens from the parchment, and the mucilage-containing water is then drained. The parchment is dried in the sun or with a mechanical dryer, and after drying to a specified moisture level, the parchment is passed through a huller that removes the hull from the green beans. Alternatively, mucilage removal may also be accomplished in a single step by use of a demucilaging pulper. In a final step, the green beans are sorted by size, and broken beans and off-color beans are removed. The sorted green beans are then bagged and stored for future sale or roasted. Thus, products, by-products, and waste products of the traditional wet processing method include coffee cherry pulp, mucilage-containing water, parchment, hull, broken and off-color green beans, and intact green beans. Traditionally parchment and intact green beans are the only materials retained for sale or storage, while all other derivatives are discarded, used as organic compost, or burned as fuel.

In a traditional dry processing method as exemplified in Prior Art FIG. 2B, ripe coffee cherries are picked and dried on concrete or soil pads. Alternatively, the ripe coffee cherries are dried on the tree and then picked ("natural-dry" method). The dried ripe coffee cherries are subsequently passed through a huller to remove the "husk" (dry combination of pulp, mucilage, and hull), and the green beans are sorted by size (broken beans and off-color beans removed), bagged, and stored for future sale or roasted. Thus, products, by-products, and waste products of the traditional dry processing method include "husk", broken and off-color green beans, and intact green beans. Similar to the wet process, traditionally intact green beans are the only materials retained for sale or storage. The other derivatives are traditionally discarded, used as organic compost, or burned as fuel.

Regardless of the source (wet or dry processing), by-products and waste products are often problematic. For example, pulp and mucilage are relatively acidic, corrosive to equipment, and difficult to safely dispose (e.g., can lower the pH of waterways which could potentially be deleterious to fish and other water organisms (Mazzafera, 2002)). Furthermore, where the pulp is discarded in a landfill or other disposal site, rotting pulp will often generate significant odors over time.

Therefore, by-products and waste products have often been viewed as materials which are either unusable, hazardous, or of negligible value. However, each component of the whole coffee cherry possesses many potentially beneficial substances if preserved in a non-degraded (non-fermented) state. For example, fresh pulp contains high levels of polyphenol antioxidants, and fresh mucilage contains complex polysaccharides and antioxidants. The hull also contains small amounts of polyphenols (less than pulp or green coffee beans) and thus could be used as an additional source for antioxidants.

Unfortunately, coffee cherries, and especially the pulp and husk tend to rapidly spoil in the presence of molds, fungi, and other microorganisms, and therefore contain almost always significant levels of mycotoxins (see e.g., Pittet, A., Tornare, D., Huggett, A., Viani, R. Liquid Chromatographic Determination of Ochratoxin A in Pure and Adulterated Soluble Coffee Using an Immunoaffinity Column Cleanup Procedure. *J. Agric. Food Chem.* 1996, 44, 3564-3569; or Bucheli, P., Kanchanomai, C., Meyer I., Pittet, A. Development of Ochratoxin A during Robusta (*Coffea canephora*) Coffee Cherry Drying. *J. Agric. Food Chem.* 2000, 48, 1358-1362). Thus, products produced from the coffee pulp, husk, mucilage, and/or whole coffee cherry generally failed to find acceptance (Although one product is advertised as "coffee cherry tea" [http://www.paradiserelocation.com/paradisetogo/foodproducts.htm], the product is actually made from coffee cherry pulp and was recently determined to have substantial quantities of mycotoxins).

There are numerous methods known in the art to remove mycotoxins, and exemplary methods include extraction or absorption from a food product (U.S. Pat. No. 4,436,756 to Canella et al., or U.S. Pat. No. 5,935,623 to Alonso-Debolt). Alternatively mycotoxins may be degraded as described in U.S. Pat. No. 5,716,820 or U.S. Pat. No. 6,025,188 to Duvick et al. In still further known methods, pesticides or other compositions that control microbial growth or production of mycotoxins in microorganisms may be employed as described in U.S. Pat. No. 5,639,794 to Emerson et al., U.S. Pat. No.

4,199,606 to Bland, U.S. Pat. No. 5,698,599 to Subbiah, or U.S. Pat. No. 3,798,323 to Leary. However, all or almost all of the known methods add substantial cost to the detoxified product, and/or are often impracticable at the site where the coffee plants are located (e.g., lack of equipment or energy sources). Still further, many of the known methods tend to leave residual quantities of chemicals in the detoxified product, thereby decreasing the potential product value or increasing health concerns.

Thus, despite numerous beneficial properties of coffee cherries and its components, whole coffee cherries are generally not used as food products as mycotoxins are typically present in substantial quantities in the ripe and overripe fruit. Consequently, consumer friendly methods for use of coffee cherries in food products or for extraction of nutrients are generally not developed. Therefore, there is still a need to provide improved methods for coffee cherries, and especially for products comprising coffee cherries with low or no mycotoxin content for human and veterinary consumption.

SUMMARY OF THE INVENTION

The present invention is directed to methods of isolating a nutrient from plant material, methods of producing a food product, and methods of marketing such nutrients and food products. Especially preferred methods include those that include quick-dried sub-ripe coffee cherries or portions thereof, wherein such coffee cherries are substantially devoid of, or have a very low content of mycotoxins.

In one aspect of the inventive subject matter, a method of manufacture of a food product has a step in which a coffee cherry or an extract of the coffee cherry is included into the food product, and it is especially preferred that the coffee cherry is a sub-ripe coffee cherry. Coffee cherries may be quick-dried and comminuted, and in particularly preferred aspects, the coffee cherry has a mycotoxin level of less than 20 ppb for total aflatoxins, of less than 10 ppb for total ochratoxins, and of less than 5 ppm for total fumonisins.

Where an extract is prepared from the coffee cherry, it is generally preferred that the coffee cherry is contacted with a solvent (preferably aqueous solvent, which may or may not be evaporated). It is still further particularly preferred that the food product is a beverage, and it is contemplated that suitable beverages include a tea, juice, and/or a carbonated beverage.

In another aspect of the inventive subject matter, a method of isolating a nutrient from a coffee plant will include one step in which a coffee cherry is provided and comminuted. In another step, the coffee cherry is contacted with a solvent to produce an extract that includes the nutrient (e.g., in form of a tea). Where suitable, such extracts may be further processed, and particularly contemplated processes include freeze-drying, and/or subjecting the extract to a chromatography (e.g., size exclusion chromatography, ion exchange chromatography, etc.) to produce a fraction that includes the nutrient (polysaccharide, polyphenolic caffeic acid, caffeine, etc.). With respect to the coffee cherry, the same considerations as provided above apply.

Consequently, a method of marketing a product may include a step in which a food product (e.g., beverage, dietary supplement, or snack) is provided. In another step, it is advertised that (a) the food product includes a coffee cherry or an extract of the coffee cherry, or (b) that the food product includes a nutrient (e.g., polyphenol, caffeine, or polysaccharide) that is isolated from the coffee cherry.

Various objects, features, aspects and advantages of the present invention will become more apparent from the following detailed description of preferred embodiments of the invention.

BRIEF DESCRIPTION OF THE DRAWING

Prior Art

Figure 1:
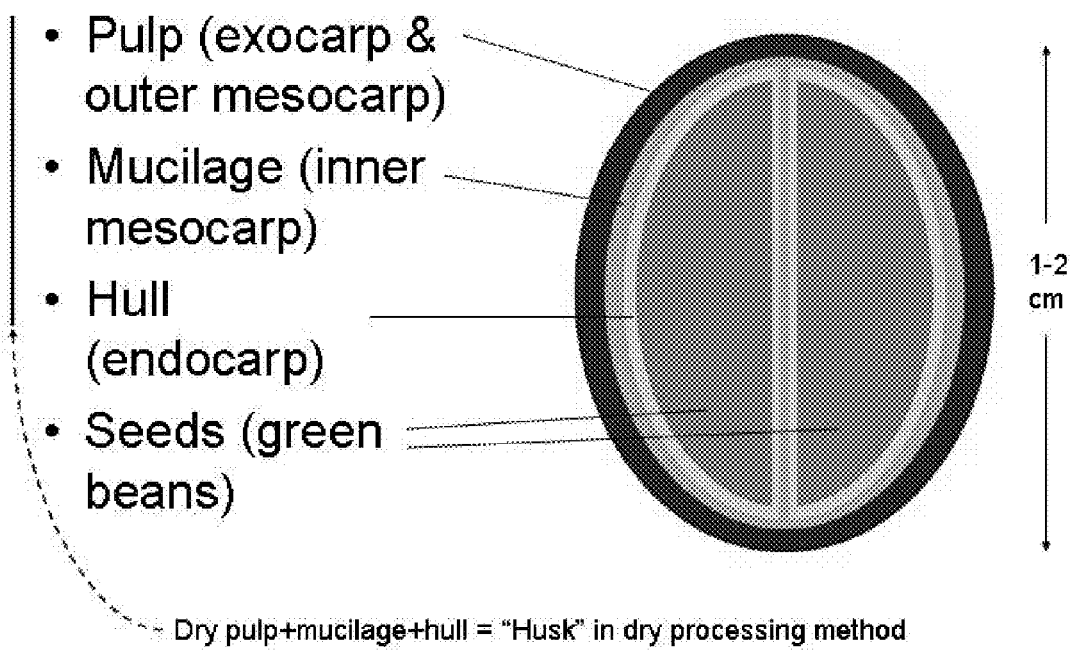
FIG. 1 is a schematic illustration of a coffee cherry.
Figure 2A:
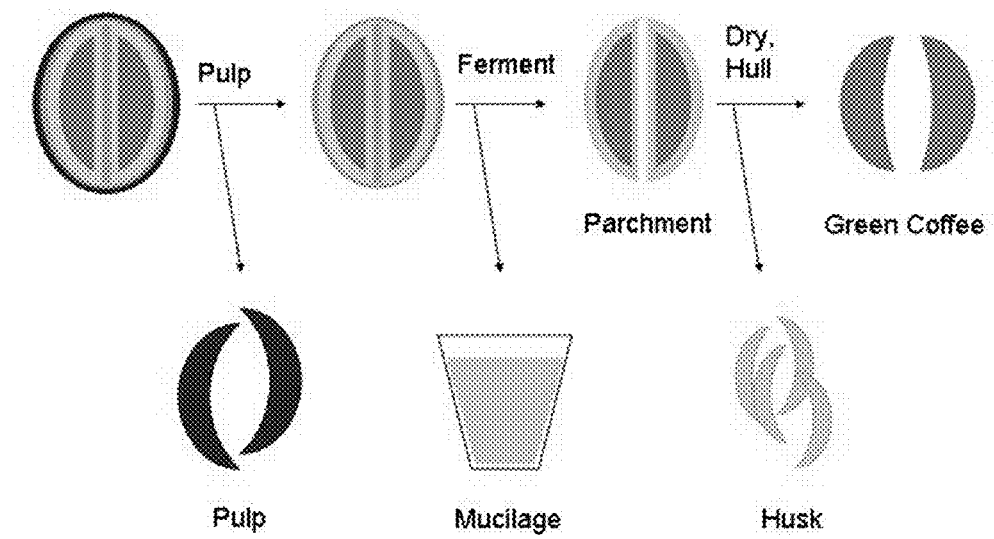

Prior Art FIG. 2A exemplifies a traditional wet processing method.

Figure 2B:
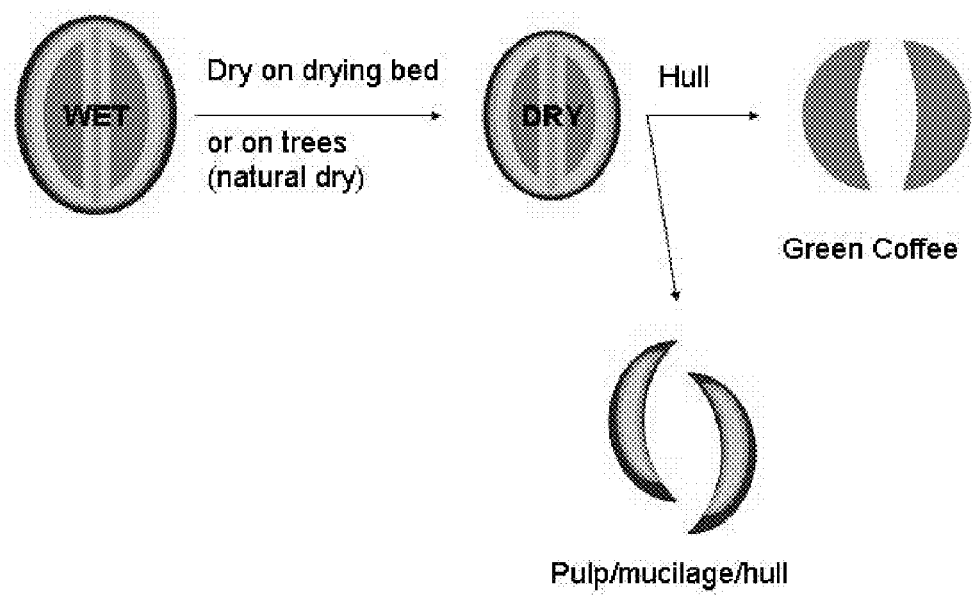

Prior Art FIG. 2B exemplifies a traditional dry processing method.

Figure 3:
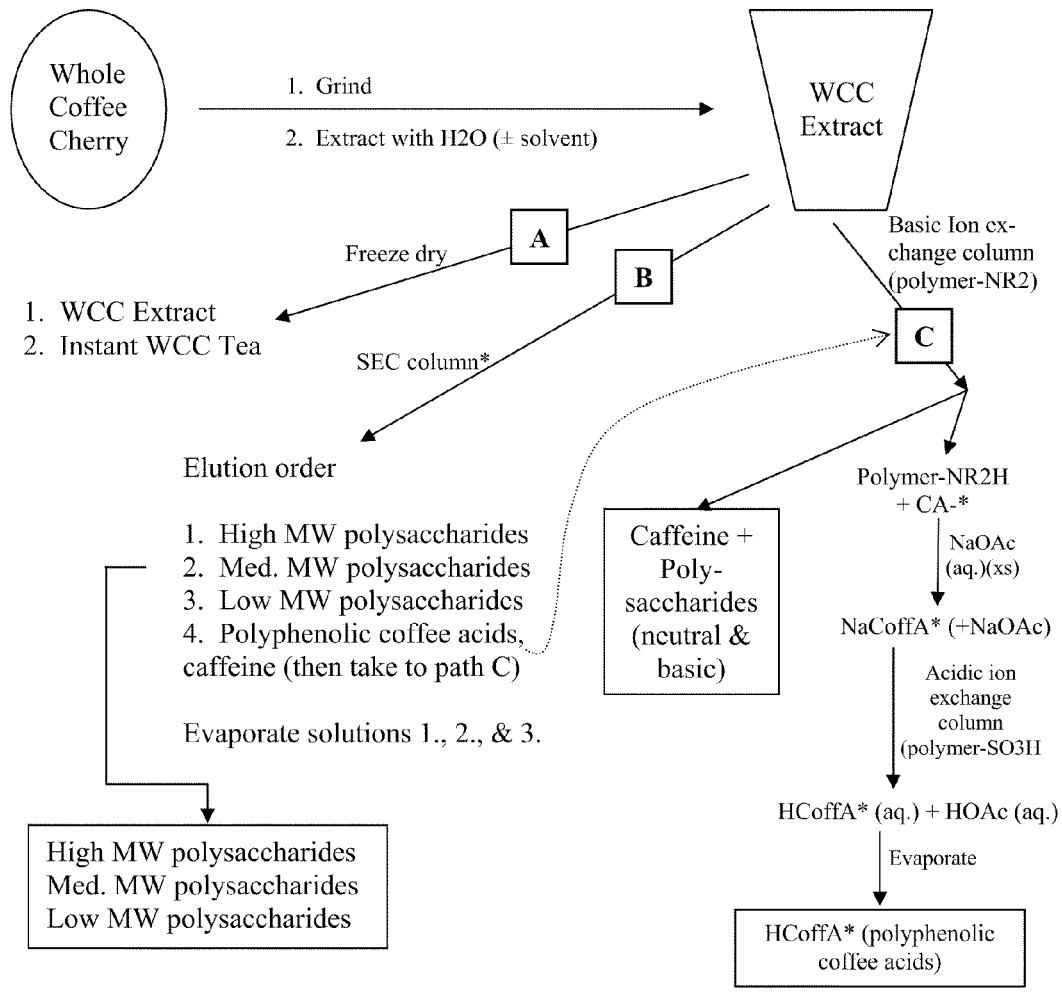

FIG. 3 depicts an exemplary scheme of preparation of various extracts from coffee cherries.

DETAILED DESCRIPTION

The inventors have discovered that low-mycotoxin or even mycotoxin-free tea, nutrients, extracts, and other food products may be produced from whole, preferably non-damaged coffee cherries that are most preferably picked at a sub-ripe stage. The inventors further discovered that use of sub-ripe (and optionally quick-dried) coffee cherries significantly reduce the likelihood of infestation of the coffee cherry with mold and fungi known to produce mycotoxins. Still further, the inventors discovered that sub-ripe coffee cherries provide not only desirable levels of flavor and aroma but also relatively high levels of polyphenols, polysaccharides, and other nutrients.

The term "food product" as used herein refers to any product that is ingested by a human and/or animal for nutritional, health-maintenance, health-improvement, and/or recreational purpose. Particularly preferred food products include those consumed by human, wherein such food products may be solid products (e.g., dietary supplement, snack bar, etc.) or liquid products (e.g., tea or other beverage, syrup or elixir, etc.). However, smokable compositions made from coffee cherries are specifically excluded from the meaning of the term "food product".

As also used herein, the term "coffee cherry" refers to the fruit of the coffee tree (*Coffea* spec., Family Rubiaceae) in which exocarp and outer mesocarp (i.e., the pulp) surround the inner mesocarp (i.e. the mucilage) and endocarp (i.e., the hull), which in turn surround the seeds (i.e., the beans). Thus, the term coffee cherry specifically refers to a whole coffee cherry, which may or may not include the stem of the cherry.

The term "sub-ripe coffee cherry" refers to a coffee cherry that has not yet reached the ripe stage, which is generally characterized by susceptibility to or presence of a fungal infection and/or presence of mycotoxins. Thus, a sub-ripe coffee cherry is at a ripeness stage in which the coffee cherry—when quick-dried—will exhibit mycotoxin levels that are below 20 ppb for total aflatoxins, below 5 ppm for total fumonisins, below 5 ppm for total vomitoxins, and below 5 ppb for ochratoxins. Consequently, quick-dried coffee cherries are typically dried within 0-48 hours (and more preferably between 6-24 hours) of the harvest such that the residual water content is no higher than 20% (wt/wt), and more typically no higher than 6-12% (wt/wt).

Viewed from another perspective, sub-ripe coffee cherries generally have a complete or almost complete (at least 95% of the cherry) red color (or in some cases yellow color), and typically include various surface defects (e.g., blemishes, cuts, and/or holes covering an area of more than 5% of the cherry). Thus, a sub-ripe coffee cherry will typically exhibit at least some green color (at least 5%, more typically at least 10%) and will typically be free of any surface defects (e.g., blemishes, cuts, and/or holes covering an area of less than 5% of the cherry). Sub-ripe coffee cherries may also be characterized in that they will remain on the coffee tree for a subsequent round of picking where the coffee cherries are hand picked and used for the production of coffee beans. Alternatively, a color sorting machine with CCD equipment may be employed to identify and select sub-ripe coffee cherries on a quantitative color basis where the coffee cherries are mass-harvested and automatically sorted.

As further used herein, the term "quick-dried" coffee cherry means that the whole coffee cherry is dried under a protocol that limits growth of molds, fungi, and/or yeast to an extent such that the dried coffee cherry will exhibit mycotoxin levels that are below 20 ppb for total aflatoxins, below 5 ppm for total fumonisins, below 5 ppm for total vomitoxins, and below 5 ppb for ochratoxins. Consequently, quick-dried coffee cherries are typically dried within 0-48 hours (and more preferably between 6-24 hours) of the harvest such that the residual water content is no higher than 20% (wt/wt), and more typically no higher than 6-12% (wt/wt).

As still further used herein, the term "mycotoxin" refers to any toxic product formed in a mold, fungus, and/or yeast that exhibits significant toxicity to a human or animal when ingested. Thus, specifically contemplated mycotoxins include aflatoxins (and particularly B1, B2, G1, and G2), fumonisins (and particularly B1, B2, and B3), ochratoxin, deoxynivalenol (DON, vomitoxin), T-2 toxin, and zearalenone. The term "total aflatoxins" therefore refers to the sum of all aflatoxin variants, the term "total fumonisins" refers to the sum of all fumonisin variants, and the term "total ochratoxins" therefore refers to the sum of all ochratoxin variants.

As also used herein, the term "nutrient" refers to a compound or mixture of compounds that is/are ingested and provides an alimentary benefit to the person ingesting the compound or mixture of compounds. Thus, the term nutrient as used herein specifically includes a compound or mixture of compounds that provide energy via metabolism of the compound or mixture of compounds (e.g., polysaccharides), interacts with the nervous system and/or immune system to modulate, and preferably stimulate, the nervous system and/or immune system (e.g., caffeine), or provides a protective function (e.g., polyphenols as antioxidant). Further contemplated nutrients include those that provide supporting functions in the alimentary tract (e.g., polysaccharides acting as soluble and/or insoluble fiber, emollient, etc.)

The term "polyphenol" as used herein refers to a diverse group of compounds produced by a plant, wherein the compounds include a phenol ring to which at least one OH group, and more typically at least two OH groups are covalently attached. For example, representative polyphenols include ellagic acid, tannic acid, vanillin, caffeic acid, chlorogenic acid, ferulic acid, catechins (e.g., epicatechin gallate, epigallocatechin), flavonols (e.g., anthocyanidins, quercetin, kaempferol), and various other flavonoids, and their glycosides and depsides. Furthermore, contemplated polyphenols may also be in oligomeric or polymeric form (e.g., oligomeric proanthocyanidins or condensed tannins).

Harvest/Drying

In one exemplary aspect of the inventive subject matter, whole undamaged sub-ripe (e.g., semi ripe or almost ripe) coffee cherries are hand picked and within about one hour quick-dried using a dry air drier at about 140° F. until constant weight is obtained. The so obtained coffee cherries typically possess significant storage stability, high resistance to infection by fungi, and lower shipping weight than wet cherry.

It is generally contemplated that the sub-ripe coffee cherries may be derived from various sources, and the particular use of the sub-ripe coffee cherries will at least in part determine the particular source(s). However, it is preferred that the sub-ripe coffee cherries are derived from a single coffee species (e.g., *coffea arabica*), which is cultivated under similar growth conditions (e.g., shade-grown). Among other advantages, it is contemplated that a single source of coffee cherries will facilitate quick-drying the sub-ripe coffee cherries. It should be recognized, however, that once the sub-ripe coffee cherries are quick-dried, various coffee species and/or coffee cherries from various growth conditions may be blended to achieve a mixture with particularly preferred characteristics.

Furthermore, it should be appreciated that depending on the particular product or use for the coffee cherry, the degree of ripeness of the coffee cherry may vary considerably. For example, where extraction of polyphenols and/or chlorogenic acid from the whole coffee cherry is desired, semi-ripe (stage 1 or stage 2) coffee cherries may be used. On the other hand, where the coffee cherry is used for the production of a coffee cherry tea and flavor and aroma are paramount, almost ripe coffee cherries may be picked. In still further contemplated aspects, unripe coffee cherries, or any reasonable mixtures of varying ripeness degrees may be used. The whole cherry is preferably free of surface defects, including cracks, splits, holes, or other openings. However, while not preferred, ripe coffee cherries, and/or coffee cherries with surface defects may also be used. While not limiting to the inventive subject matter, it is generally preferred that the sub-ripe coffee cherries (or coffee cherry mixtures) are washed with water or other aqueous solution (e.g., diluted hypochlorite solution) to remove soil particles and other debris before drying.

Quick-drying is preferably performed immediately after picking to up to about two days after picking until a constant weight is obtained (or until the outer pulp of the cherry has dried). Thus, and depending on the particular heat source available, it is generally preferred that quick-drying is performed at a temperature of about 100° to about 180° F. for a period of about 6-48 hours. For example, where electrical (or other) energy is readily available, the sub-ripe coffee cherries may be dried in a warm air drier in a stationary or rotating drum, or in a refractance window drying process. Alternatively, the sub-ripe coffee cherries may also be freeze dried. On the other hand, and especially where energy sources are not readily available, the sub-ripe coffee cherries may be sun dried. However, regardless of the particular drying method, it should be recognized that the sub-ripe coffee cherries are quick-dried to prevent production of mycotoxins from fungi, molds, and/or yeast that are already present and/or colonize (e.g., via infection or sporulation) the coffee cherry. Thus, sub-ripe coffee cherries are advantageously dried on a surface that is clean and free of sources of mycotoxin contamination. In further alternative aspects of the inventive subject matter, the sub-ripe coffee cherries may also be frozen and stored/transported until quick-drying can be implemented.

In another exemplary aspect of the inventive subject matter, and especially where the coffee cherries are extracted or otherwise processed at or near the site of harvest (e.g., within 50 miles of harvest), it is contemplated that the coffee cherries are not quick-dried at all. Viewed from another perspective, it is contemplated that "wet" (non-dried) coffee cherries may also be used in conjunction with the methods presented herein. Such uses are especially advantageous where a reduction in energy consumption is particularly desired (or where energy for quick-drying is not available). Thus, it should be recognized that the coffee cherries may be processed within hours of the harvest.

Grinding

Regardless of the state of the coffee cherries (e.g., quick-dried, flash-frozen, or fresh), it is contemplated that the coffee cherries may then without further mycotoxin detoxification be employed for various uses in numerous food products or for extraction of a nutrient. For example, where a quick-dried sub-ripe coffee cherry is used in a food product, the coffee cherry may be admixed with another consumable (e.g., admixture with grain for animal feed, or coating with chocolate for human consumption).

Alternatively, it is particularly preferred that the coffee cherry (e.g., wet or quick-dried) is comminuted and contacted with a solvent to form an extract, which may then be directly added to a food product (or used as a food product), or which may be further processed. For example, where the coffee cherry is employed as a basis for brewing coffee cherry tea, grinding of the coffee cherry to a size of 500-3000 μm is preferred for use as loose tea. Alternatively, grinding of the coffee cherry to a size of 200-1000 μm is preferred for bagged teas. In further contemplated uses, it is contemplated that only parts of a quick-dried sub-ripe coffee cherry may be employed in a food product. For example, where the sub-ripe coffee cherry is in an almost ripe state, it is contemplated that the pulp, mucilage, and/or hull may be separated from the seeds, which are then (optionally admixed with other seeds) roasted to commercial grade coffee beans. The remaining pulp, mucilage, and/or hull from the quick-dried sub-ripe coffee cherry may then be employed as food additive or basis for extraction of one or more desired components (e.g., polyphenols), wherein the remaining pulp, mucilage, and/or hull may optionally be further comminuted.

Extraction

In one preferred example, a wet coffee cherry is comminuted using a food processor or other appropriate grinder so that relatively small (e.g., 0.1 to 5 mm) particles are obtained. Water is then added (preferably at 50:50 v/v) and the suspension heated at 180-212° F. (boiling water) for 30 minutes to 2 hours. The suspension is filtered to separate solid material from liquid. Where desirable, the solid material may then be extracted again with water and filtered. This process may be repeated for as many times as needed to extract all the desired components and/or nutrients. The sum of all the liquid extracts is then evaporated by spray drying, freeze drying, falling film evaporation, or other method to obtain a solid extract product. Alternatively, the liquid extracts may also be used without evaporating or with partial evaporation of the water to give a liquid extract product.

In another preferred example, a quick-dried coffee cherry may be used (e.g., where the coffee cherry is to be stored for extended periods of time, it is advantageous to dry the coffee cherry) for extraction. In such examples, the dried coffee cherry is ground in a suitable grinder to a particle size of approximately 100-5000 μm. Solvent (e.g., water or water/solvent mixture) is added, preferably at a level of 5:1 to 20:1 vol. solvent/wt. ground cherry. The resulting mixture is boiled for 30 minutes to 6 hours, filtered or centrifuged while hot to separate solids from liquid, and the liquid extract evaporated (the solids may be extracted again for as many times as is necessary to extract all the desired materials). The combined extracts may be evaporated to give a solid whole coffee cherry extract, which could be used as an instant tea type preparation. Alternatively, the liquid extract may be kept as is and processed further as described below.

In alternative aspects, it should be appreciated that numerous variations to the above procedures may be employed without departing from the inventive concept presented herein. For example, extraction may be performed on intact coffee cherries. Such procedure may be particularly advantageous where the coffee cherry is in an almost ripe state, and is subsequently used to isolate the coffee bean for drying and roasting. On the other hand, where the coffee cherry is comminuted (e.g., to increase surface contact with the solvent), all sizes of the ground cherry are contemplated. Similarly, the coffee cherry may also be crushed in a press to obtain a coffee cherry juice and mashed coffee cherries, wherein both the coffee cherry juice as well as the mashed coffee cherries may be directly incorporated into a food product or further processed in an extraction and/or drying process.

With respect to the solvent, it should be recognized that the particular nature of the solvent or solvent mixture will—among other factors—depend on the nutrient, compound, or extract that is desired. However, it is generally preferred that suitable solvents include those that are non-toxic (e.g., solvents approved for food processing), or that can be substantially completely (i.e., greater than 99.99%) removed from the extract. Therefore, especially preferred solvents include water, ethanol, ethyl lactate, liquid carbon dioxide, ethyl acetate, etc., and all reasonable combinations thereof. Similarly, temperatures and durations of the extraction process may vary considerably. However, it should be recognized that a person of ordinary skill in the art will be readily able to determine preferred temperatures and/or durations dependent on the particular component or nutrient. For example, optimum extraction temperature and/or durations for polyphenols can be determined by monitoring polyphenol yield at various temperatures and durations. Likewise, a person of ordinary skill in the art will easily be able to determine if a second or further extraction of previously extracted material is required/desired based on residual yields.

Processing of Extracts

It is generally contemplated that the so obtained extracts can be directly employed as a food product (e.g., nutritional supplement, or additive to a food product) or further processed, wherein further processing steps include partial or complete drying to form a concentrate or dry extract, and chromatography to concentrate a particularly desired nutrient or nutrient fraction. With respect to drying, it is contemplated that all known manners of drying are considered suitable for use herein, and especially preferred methods of drying include freeze-drying and spray-drying. Where one or more chromatographic separations of the extract are employed, it is generally contemplated that all chromatographic methods are suitable for use herein. Thus, contemplated chromatographies include size exclusion chromatography, molecular sieving chromatography, ion exchange chromatographies, hydrophobic interaction chromatographies, and affinity chromatography.

An exemplary scheme of preparation of various extracts from coffee cherries is depicted in FIG. 3. Here, sub-ripe coffee cherries (wet or quick-dried) are ground and then extracted with water to form a first extract (WCC extract), which is evaporated to dryness as depicted in Route A. Such dry extracts may be employed to provide an instant coffee cherry tea, a nutritional supplement, or a material that is admixed to another food product. Dry extracts may be formulated with additional ingredients (e.g., agents that promote dissolution, flow agents, etc.), and may be packaged in all manners known in the art.

For isolation of highly concentrated or solid polyphenols mixture (e.g., coffee acids, including caffeic, chlorogenic, ferulic acids), the aqueous extract is passed through a column containing basic ion exchange resin which retains the coffee acids polyphenols on the resin as depicted in Route C. Caffeine and neutral and basic polysaccharides pass through the resin and may be processed further. To isolate the coffee acids polyphenols, sodium acetate solution is added to the resin, which releases the coffee acids polyphenols and elutes from the column as sodium salts. The sodium salts solution is then passed through a column containing an acidic ion exchange resin, which regenerates the coffee acid polyphenols plus acetic acid by-product. The aqueous eluate is then evaporated to give pure coffee acids polyphenols.

For isolation of polysaccharides as shown in Route B, the aqueous extract or the pass fraction obtained from the ion exchange column (see above) is further separated in a size exclusion chromatography column. High molecular weight polysaccharides [Mw>100,000] will elute first, followed by medium molecular weight [Mw>10,000-100,000] and low molecular weight polysaccharides [Mw<10,000]. Coffee acids polyphenols and/or caffeine will elute last.

Using exemplary procedures and solvents according to FIG. 3, the inventors observed an average polyphenols content of the dried whole coffee cherries of between 3.3-3.8% (on a dry weight basis). Green coffee cherry possessed the highest content, at 3.8%. Almost ripe coffee cherry possessed the lowest polyphenol content, at 3.3%. These levels are slightly less than that obtained from green coffee beans (4.6%) or roasted coffee (3.9%), but this difference is moderated by the fact that two pounds of whole coffee cherry would be used to obtain one pound of green coffee beans or roasted coffee (see below).

It should be especially appreciated that the benefits of this type of whole coffee cherry processing to the coffee industry are potentially enormous: The world produces over 15 billion pounds of green coffee annually (production in 2002 was 118,782,000 bags (at 60 kg) or 15.7 billion lbs. (International Coffee Organization, http://www.ico.org/frameset/traset.htm)). This amount of green coffee beans is obtained from 31.4 billion pounds of dry coffee cherry equivalent. Thus if even one-tenth of one percent of green coffee bean production were diverted to produce polyphenols, the yield of polyphenols would be 31,400,000,000 lb.×0.001×0.038=1,193,200 lb. polyphenols. In contrast, if the green beans obtained from this amount of whole coffee cherry were processed to produce polyphenols, the yield would be 15,700,000,000 lb.×0.001×0.046=722,200 lb. polyphenols, 60% of that which could be obtained from whole coffee cherry.

Therefore, the inventors contemplate a method of manufacture of a food product in which in one step a coffee cherry or an extract of the coffee cherry is included into the food product. Most preferably, the coffee cherry is in a sub-ripe state, and may advantageously (but not necessarily) be quick-dried. Thus, particularly preferred coffee cherries will have a mycotoxin level of less than 20 ppb for total aflatoxins, less than 10 ppb for total ochratoxins, and less than 5 ppm for total fumonisins. Alternatively, contemplated mycotoxin levels may also be in the range of 20-50 ppb, but more preferably less than 15 ppb, even more preferably less than 10 ppb, and most preferably less than 5 ppb for total aflatoxins. Similarly contemplated mycotoxin levels also include a range of 10-30 ppb, but more preferably less than 5 ppb, even more preferably less than 3 ppb, and most preferably less than 2 ppb for total ochratoxins. Likewise, contemplated mycotoxin levels also include a range of 5-20 ppm, but more preferably less than 15 ppm, even more preferably less than 10 ppm, and most preferably less than 5 ppm for total fumonisins and/or vomitoxins.

Preferred extracts are prepared by contacting the coffee cherry with a solvent (e.g., non-toxic solvent, aqueous solvent, and optionally evaporating the solvent), and may be admixed to a beverage, and particularly tea, a juice (i.e., a beverage comprising a natural or synthetic flavor of a fruit or vegetable), or a carbonated beverage.

Thus, contemplated methods also include those directed towards isolating a nutrient from a coffee plant, wherein a coffee cherry is provided and comminuted. In a further step, the comminuted coffee cherry is contacted with a solvent to produce an extract that includes the nutrient. The extract may then be subjected to various treatments (e.g., size exclusion chromatography, ion exchange chromatography) to enrich a desired nutrient (e.g., high molecular weight polysaccharide, medium molecular weight polysaccharide, low molecular weight polysaccharide, polyphenolic caffeic acid, and/or caffeine) or other component, or to transform the extract into a particularly advantageous form (e.g., freeze-dried powder, concentrated syrup, etc.).

Consequently, a method of marketing a product may therefore include one step in which a food product (e.g., beverage, dietary supplement, or snack) is provided. In another step, it is advertised that (a) the food product includes a coffee cherry or an extract of the coffee cherry, or (b) that the food product includes a nutrient (e.g., polyphenol, caffeine, or polysaccharide) that is isolated from the coffee cherry. Of course, it should be recognized that all known forms of advertising are considered herein, and particularly preferred forms include providing printed information (e.g., package insert, labeling on a package, booklet), displayed information (e.g., TV commercial, Internet commercial, Internet website including information specified under (a) and/or (b) above), and audible information (e.g., radio commercial, person-to-person consultation, audio-taped information including information specified under (a) and/or (b) above).

Contemplated food products especially include beverages prepared from contemplated quick-dried sub-ripe coffee cherries (or fragments or portions thereof), or beverages to which extracts or pieces from contemplated quick-dried sub-ripe coffee cherries (or fragments or portions thereof) have been added. Similarly, further contemplated food products include baked goods (e.g., bread, crackers, etc.), snacks (e.g., candy or energy bars), cereals, and other solid nutrients to which extracts or pieces from contemplated quick-dried sub-ripe coffee cherries (or fragments or portions thereof) have been added. Alternatively, contemplated food products also include a nutritional supplement in liquid or solid form that comprises an extract of the quick-dried sub-ripe coffee cherry.

Still further contemplated compositions and methods are disclosed in our co-pending U.S. patent application with the title "Low-Mycotoxin Coffee Cherry Products", filed on or about Apr. 16, 2003, which is incorporated by reference herein.

EXAMPLES

The following examples are provided to enable a person of ordinary skill in the art to make and use compositions according to the inventive subject matter and to illustrate exemplary compositions and methods generally described herein.

Harvest of Whole Coffee Cherries

The ripeness of the coffee cherries was determined by visually estimating the amount of green and red color (or yellow, where applicable) of the whole cherries. As the cherries ripen, the green cherries will typically increase in size and subsequently develop increasing amounts of red color. For the present examples, the coffee cherries were collected at four stages of ripeness: Completely, or almost completely green (unripe; typically less than 5% of the coffee cherry red or yellow), primarily green with some red (semi-ripe, stage 1; typically less than 25% of the coffee cherry red or yellow), primarily red with some green (semi-ripe, stage 2; typically less than 25% of the coffee cherry green), and unbroken, unblemished red (almost ripe; typically less than 10% of the coffee cherry green; area of blemishes, cuts, or otherwise broken surface less than 5%).

Cherries were collected from three separate areas of one coffee plantation, and included two varieties of coffee (Catuai and Bourbon), and two types of growing methods (sun-grown and shade-grown). Approximately 500-1000 g of coffee fruit at each ripeness stage in each area was collected, yielding a total of 12 samples. As much as possible, whole, unbroken, and uncut cherries were collected.

Quick-Drying of the Whole Coffee Cherries

Whole coffee cherries for sample extraction were prepared by drying the cherries within 1-12 hours after harvest on separate trays of an air dryer according to the following procedure. Coffee cherries (400-600 g) were weighed into beakers and washed two times with tap water, followed by a single wash with distilled water. The so washed coffee cherries were placed on a tray of an air dryer to drain, and then dried at 150-160° F. for 16-18 hours to constant weight. Drying was stopped when the weight at two consecutive one-hour intervals differed by less than 1 g. Typical yields of dried whole cherry were 160-220 g. Further analysis indicated 6-12% residual water content in the dried cherry.

Mycotoxin Analysis

In order to determine the viability of the whole coffee cherry at the unripe, semi-ripe, and almost ripe stages (see above) for use in a food product or base material for an extract, the level of selected mycotoxins was measured and compared against comparative products and red, ripe coffee cherry by-product from coffee production. As can be clearly seen in Table 1 below, quick-dried coffee cherries of all sub-ripe harvest stages had a mycotoxin level below the detection limit of 1 ppb (as measured for aflatoxin and ochratoxin).

The mycotoxin concentration was determined in an independent laboratory by both ELISA and HPLC analysis. Based on the below results, the inventors conclude that all samples from the different sub-ripe harvest stages are suitable for direct use in a nutritional product for both human and veterinary consumption. In contrast, the by-product of coffee production (predominantly consisting of pulp, mucilage, and hull from coffee cherries) from ripe cherries of red color with blemishes (typically greater than 20% of the cherry surface) had a substantial content in both aflatoxins and ochratoxins. Similarly, the comparative product "Paradise to Go Tea" (made from coffee cherry pulp) exhibited mycotoxins in double-digit concentrations.

TABLE 1

| RIPENESS | COLOR | AFLATOXIN | OCHRATOXIN |
|---|---|---|---|
| Unripe, quick-dried | Green | <1 ppb | <1 ppb |
| Semi-ripe Stage 1, quick-dried | Mostly green with some red | <1 ppb | <1 ppb |
| Semi-ripe Stage 2, quick-dried | Mostly red with some green | <1 ppb | <1 ppb |
| Almost ripe, quick-dried | Red, Blemished Area <5% | <1 ppb | <1 ppb |
| Ripe (by-product of Coffee Production) | Red, Blemished Area >20% | >200 ppb | >500 ppb |
| Paradise to Go Tea (dry matter) | N/A | >25 ppb | >40 ppb |

Polyphenol (PP), Chlorogenic Acid (CG), and Caffeine (CF) Analysis for Quick-Dried Sub-Ripe Whole Coffee Cherries In a further series of experiments, the levels of total polyphenols, chlorogenic acid, and caffeine from quick-dried whole coffee cherry at various sub-ripe stages were measured and compared against green and roasted coffee beans. Table 2 summarizes the results of this analysis.

Interestingly, while the polyphenol (PP) level of quick-dried coffee cherries of all sub-ripe harvest stages was somewhat less than the level of green or roasted coffee beans, significant quantities of polyphenols in quick-dried sub-ripe coffee cherries still remain. Similarly, the chlorogenic acid (CG) content of quick-dried whole coffee cherry at various sub-ripe stages remained at substantial high levels as compared to roasted coffee, but was somewhat lower as compared to green beans. The caffeine (CF) level of quick-dried coffee cherries of all sub-ripe harvest stages was substantially within the caffeine level of green and roasted coffee beans (It should be pointed out that all data given are on a dry matter basis and are not normalized to the dry weight of the bean).

Polyphenol analysis: Dried whole coffee cherry (or green beans or roasted beans) (1.00 g) were ground in a rotating steel knife coffee grinder for 30 seconds to produce a ground sample. The ground sample was added to 100 mL distilled water and the resulting mixture heated to boiling in an Erlenmeyer flask for 30 minutes. The heat was removed and the mixture allowed to cool to room temperature. The resulting suspension was transferred to a 100 mL graduated cylinder and water added to bring the volume to 100 mL. The mixture was then transferred back to the Erlenmeyer flask, stirred briefly, and the solids allowed to settle. An aliquot (~3 mL) of the supernatant solution was filtered through an 0.45 μm Acrodisc filter, and the resulting clear solution was diluted 1:10 with distilled water using a volumetric flask (1.00 mL diluted with 9.00 mL distilled water).

The Folin-Ciocalteu method was used to measure the polyphenol content of the diluted solution as follows. One mL of the diluted solution was added to a test tube, mixed with 1 mL of 0.2N Folin-Ciocalteu's Phenol reagent (Sigma solution, 2N, diluted 1:10 with water), and allowed to stand 5 minutes at room temperature. One mL of 1N $NaHCO_3$ was added and the reaction mixture left at room temperature for 2 hours. The polyphenol level was determined using a UV-visible spectrophotometer standardized against catechin, at $\lambda max$=750 nm against distilled water as blank.

Chlorogenic acid: Determination of chlorogenic acid was done using HPLC separation of the filtered clear solution prepared above using standard analytical and separation protocols well known in the art. Similarly, determination of caffeine was done using HPLC separation of the filtered clear solution prepared above using standard analytical and separation protocols well known in the art (for exemplary protocols see e.g., Bispo M. S., et al. in J. Chromatogr. Sci.; 2002, January; 40(1):45-8, or Nakakuki, H. et al. in J. Chromatogr. A.; 1999, Jul. 2; 848(1-2):523-7).

TABLE 2

| RIPENESS | COLOR | % PP | % CG | % CF | CG/CF |
|---|---|---|---|---|---|
| Unripe, quick-dried | Green | 3.80 | 2.64 | 1.03 | 2.56 |
| Semi-ripe stage 1, quick-dried | Mostly green with some red | 3.28 | 2.70 | 1.00 | 2.70 |
| Semi-ripe stage 2, quick-dried | Mostly red with some green | 3.54 | 2.00 | 0.70 | 2.86 |
| Almost ripe, quick-dried | Red, Blemished Area <5% | 3.35 | N/D | N/D | N/D |
| Green Coffee beans | Green | 4.58 | 3.31 | 0.95 | 3.48 |
| Roasted Coffee beans | Brown | 3.93 | 0.50 | 1.20 | 0.42 |

Polyphenol (PP), Chlorogenic Acid (CG), and Caffeine (CF) Analysis for Various Extracts Prepared from Quick-Dried Sub-Ripe Whole Coffee Cherries The extraction of sub-ripe quick-dried whole coffee cherries of was carried out with various aqueous solvents (100% ethanol, 75:25 (v/v) ethanol/water, 50:50 (v/v) ethanol/water, and water) to determine the polyphenol content of the extracts. Dried whole coffee cherry (10-20 g) was ground in a rotating steel knife coffee grinder for 30 seconds. The ground sample (10.0 g) was added to 100 mL solvent and the mixture boiled with stirring for 90 minutes. Determination of polyphenols, chlorogenic acid, and caffeine were performed substantially as described above. Table 3 summarizes the results.

TABLE 3

| RIPENESS | SOLVENT | % PP | % CG | % CF | CG/CF |
|---|---|---|---|---|---|
| Unripe | 100% Ethanol | 5.84 | 4.96 | 4.46 | 1.11 |
| Unripe | 75:25 Ethanol/Water | 13.80 | 12.38 | 4.11 | 3.01 |
| Unripe | 50:50 Ethanol/Water | 14.22 | 14.18 | 4.40 | 3.22 |
| Unripe | Water | 10.93 | 8.61 | 3.04 | 2.83 |
| Semi-ripe Stage 1 | Water | 9.38 | 7.58 | 2.72 | 2.78 |
| Semi-ripe Stage 2 | Water | 8.51 | 6.74 | 1.71 | 3.95 |
| Almost ripe | Water | 6.92 | 1.34 | 0.29 | 4.61 |
| Semi-ripe Stage 2 | 100% Ethanol | 3.67 | 0.60 | 0.51 | 1.18 |
| Semi-ripe Stage 2 | 75:25 Ethanol/Water | 9.80 | 9.14 | 2.59 | 3.53 |
| Semi-ripe Stage 2 | 50:50 Ethanol/Water | 9.55 | 8.79 | 2.59 | 3.40 |

Polyphenol (PP), Chlorogenic Acid (CG), and Caffeine (CF) Yield in Various Extracts Prepared from Quick-Dried Sub-Ripe Whole Coffee Cherries Dried coffee cherries (10-20 g) were ground in a rotating steel knife coffee grinder for 30 seconds. The ground sample (10.0 g) was added to 100 mL appropriate solvent and the mixture boiled with stirring for 90 minutes. The mixture was filtered while hot, the filter cake washed twice with the solvent and the filtrate allowed to cool to room temperature. The combined filtrates were rotary evaporated to dryness, using ethanol to remove the final traces of water as an azeotrope. The solid extract was placed in a vacuum desiccator to dry overnight under high vacuum to remove traces of solvent. Table 4 summarizes the results in yield percentages.

TABLE 4

| RIPENESS | SOLVENT | YIELD | % PP | % CF | % CF |
|---|---|---|---|---|---|
| Unripe | 100% Ethanol | 12.6 | 0.74 | 0.62 | 0.56 |
| Unripe | 75:25 Ethanol/Water | 22.7 | 3.13 | 2.81 | 0.93 |
| Unripe | 50:50 Ethanol/Water | 20.7 | 2.94 | 2.94 | 0.91 |
| Unripe | Water | 46.0 | 5.03 | 3.96 | 1.40 |
| Semi-ripe Stage 1 | Water | 53.8 | 5.05 | 4.08 | 1.47 |
| Semi-ripe Stage 2 | Water | 60.5 | 5.15 | 4.08 | 1.03 |
| Almost ripe | Water | 68.7 | 4.75 | 0.92 | 0.20 |
| Semi-ripe Stage 2 | 100% Ethanol | 17.0 | 0.62 | 0.10 | 0.09 |
| Semi-ripe Stage 2 | 75:25 Ethanol/Water | 25.3 | 2.48 | 2.31 | 0.65 |
| Semi-ripe Stage 2 | 50:50 Ethanol/Water | 21.5 | 2.05 | 1.89 | 0.56 |

Theoretical Calculation of Polyphenol Yield from Coffee Cherries

The inventors observed that the unripe (green) coffee cherry is the richest source of polyphenol antioxidants. The semi-ripe and ripe cherry is also higher than green or roasted coffee beans, based upon the amount of polyphenols obtained from an equal amount of starting dry whole coffee cherry. Consequently, it should be appreciated that polyphenols can be effectively obtained by extracting the whole coffee cherry rather than the green or roasted coffee beans. For example (based on the data below), extraction of 10000 lb. of green coffee cherry (dry weight) would produce 380 lb. of polyphenols. The amount of green coffee beans that would be obtained from 10000 lb. of dry coffee cherry is 10000 lb.× 0.50=5000 lb. The extract that would be obtained from this is 5000 lb.×0.458=229 lb. Thus, almost double the amount of polyphenols can be obtained using the whole coffee cherry instead of green coffee beans. Table 5 below depicts an exemplary calculation of polyphenols available from a given amount of whole wet coffee cherry, in this case, 100,000 lb.

The theoretical calculation of polyphenol yield was based on the following assumptions (data obtained from International Coffee Organization, http://www.ico.org/frameset/coffset.htm): Wet whole coffee cherries provide approximately 36% (wt) yield of dry whole coffee cherries. Dry whole coffee cherries provide approximately 50% (wt) yield of green coffee beans, which in turn provide approximately 80% by weight of roasted beans. 100000 lb of wet coffee cherries are employed as starting material. Polyphenol amount (in lb) is expressed in catechin equivalents.

TABLE 5

| RIPENESS | COLOR | TOTAL PP |
|---|---|---|
| Unripe | Green | 1368 |
| Semi-ripe Stage 1 | Mostly green with some red | 1181 |
| Semi-ripe Stage 2 | Mostly red with some green | 1236 |
| Almost ripe | Red | 1210 |
| Green Coffee beans | Green | 824 |
| Roasted Coffee beans | Brown | 566 |

Brewing of Teas from Whole Coffee Cherry of Different Ripeness

The following procedure was used to prepare teas from whole coffee cherry of different ripeness for aroma and taste testing. Whole dried coffee cherry (10-20 g) was ground in a rotating steel knife coffee grinder for 10-30 seconds to produce a ground sample. The ground coffee cherry (2.0 g) was placed in a ceramic cup and of nearly boiling water (6 oz., 190-200° F.) added. The slurry was stirred and allowed to stand for 3 minutes, at which time the aroma and taste of the supernatant liquid were noted. Results are shown in Table 6.

TABLE 6

| RIPENESS | COLOR | AROMA | TASTE | PP/6 OZ. TEA |
|---|---|---|---|---|
| Unripe, quick-dried | Green | None | Almost no taste | 76 mg |
| Semi-ripe stage 1, quick-dried | Mostly green with some red | Very mild fruity | Slight fruit flavor | 66 mg |
| Semi-ripe stage 2, quick-dried | Mostly red with some green | Mild fruity | Mild fruit flavor | 71 mg |
| Almost ripe, quick-dried | Red, Blemished Area <5% | Fruity | Rich fruit flavor | 67 mg |

Addition of Solid Aqueous Whole Coffee Extracts to Beverages

Solid aqueous coffee cherry extract was used to provide the same level of polyphenols as the whole coffee cherry teas described above (60-70 mg/6 oz., or 10 mg per ounce). About 100 mg of solid unripe (140 mg for almost ripe) aqueous whole coffee cherry extract (provides ~10 mg polyphenols) was added to one ounce of beverage and stirred to dissolve. Beverages used were a popular cola, hot coffee, and hot black tea. A panel of 3-4 persons tasted the beverages. Each of the beverages prepared with unripe aqueous coffee cherry extract added possessed flavor almost identical to the original. The beverages prepared with almost ripe aqueous whole coffee cherry extract possessed a definite fruity note in the taste profile.

The unripe (green) whole coffee fruit and aqueous extract possesses the highest polyphenols levels in the dry cherry as well as in the aqueous extracts. Also, as described above, the unripe fruit extracts possess the least flavor and aroma characteristics. Addition of such extracts to existing beverages would be beneficial as it would increase their polyphenols (antioxidant) content yet would not significantly alter or affect the taste and aroma of the beverage. Beverages normally considered to possess minimal health benefit could in this way be made healthier.

As an additional benefit, the whole coffee cherry extracts, which normally contain both polyphenols and caffeine could be added to drinks in which caffeine is an ingredient. For example, by adding whole coffee cherry extract to soft drinks (especially colas and similar drinks), one would add caffeine (as a natural caffeine source) as well as polyphenol antioxidants. Manufacturers of such soft drinks could claim the added benefit of polyphenol antioxidants in their caffeinated beverages.

Thus, specific embodiments and applications of low-mycotoxin coffee cherry products have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of producing a food product, comprising:
   adding an extract of whole coffee cherries to a food product for human consumption;
   wherein the extract is prepared from comminuting whole coffee cherries and solvent extraction of the comminuted coffee cherries with an aqueous solvent; and
   wherein the coffee cherries are optionally quick-dried within 48 hours after harvest to a residual water content of equal or less than 20 wt %.

2. The method of claim 1 wherein the whole coffee cherries are sub-ripe whole coffee cherries that have at least 10% green color.

3. The method of claim 1 wherein the whole coffee cherries are sub-ripe whole coffee cherries that have between at least 5% green color and less than 25% green color.

4. The method of claim 1 wherein the whole coffee cherries are whole coffee cherries that have less than 10% green color and that have surface defects that cover less than 5% of the surface area of the cherries.

5. The method of claim 1 wherein the whole coffee cherries are quick-dried whole coffee cherries.

6. The method of claim 1 wherein the extract of whole coffee cherries is a water extract.

7. The method of claim 6 wherein the extract is processed to enrich the preparation in a nutrient fraction selected from the group consisting of caffeine, polysaccharides, ellagic acid, tannic acid, caffeic acid, chlorogenic acid, ferulic acid, flavonols, and flavonoids.

8. The method of claim 1 wherein the whole coffee cherries are quick-dried coffee cherries that have less than 20 ppb total aflatoxins, less than 5 ppb total ochratoxins, and less than 5 ppm total fumonisins without a step of mycotoxin detoxification.

9. The method of claim 1 wherein the food product is a solid food product.

10. The method of claim 1 wherein the food product is a solid food product selected from the group consisting of a baked good, a snack, a cereal, and a nutritional supplement.

11. The method of claim 1 wherein the food product is a beverage.

12. The method of claim 1 wherein the food product is a beverage selected from the group consisting of a tea, a juice, and a carbonated beverage.

13. A method of producing an extract for use in combination with a food product for human use, comprising:
   harvesting a plurality of whole coffee cherries and drying the whole coffee cherries under a protocol that limits microbial growth to an extent such that the dried whole coffee cherries exhibit mycotoxin levels that are below 20 ppb for total aflatoxins, below 5 ppm for total fumonisins, below 5 ppm for total vomitoxins, and below 5 ppb for ochratoxins;
   comminuting the whole dried coffee cherries, and combining the comminuted dried coffee cherries with a solvent to form an extraction mixture; and
   filtering the extraction mixture to produce an extract, and optionally removing the solvent from the extract.

14. The method of claim 13 wherein the protocol includes a step of drying the whole coffee cherries within 48 hours after harvest to a residual water content of equal or less than 20 wt % to so form the plurality of whole dried coffee cherries.

15. The method of claim 13 further comprising a step of processing the extract using a chromatographic step selected from the group consisting of size exclusion chromatography, molecular sieving chromatography, ion exchange chromatography, hydrophobic interaction chromatography, and affinity chromatography.

16. The method of claim 13 wherein the whole coffee cherries are sub-ripe whole coffee cherries that have between at least 5% green color and less than 25% green color.

17. A method of producing a powder or extract for use in combination with a food product for human use, comprising:
   harvesting a plurality of whole coffee cherries;
   processing the whole coffee cherries to form the powder or extract by either
   (b) comminuting the whole coffee cherries, extracting the comminuted whole coffee cherries with an aqueous solvent to form an aqueous extract, and at least partially dehydrating the aqueous extract; or
   (c) dehydrating and comminuting the whole coffee cherries, wherein the whole coffee cherries are dried under a protocol that limits microbial growth to an extent such that the dried coffee cherry exhibits mycotoxin levels that are below 20 ppb for total aflatoxins, below 5 ppm for total fumonisins, below 5 ppm for total vomitoxins, and below 5 ppb for ochratoxins, extracting the dehydrated and comminuted coffee cherries with an aqueous solvent to form an aqueous extract, and at least partially dehydrating the aqueous extract.

18. The method of claim 17 wherein the protocol includes a step of drying the whole coffee cherries within 48 hours after harvest to a residual water content of equal or less than 20 wt % to so form the plurality of dried whole coffee cherries.

19. The method of claim 17 wherein the whole coffee cherries are unbroken unblemished red whole coffee cherries having a surface that is less than 10% green and less that 5% broken.

* * * * *

(12) EX PARTE REEXAMINATION CERTIFICATE (9767th)
United States Patent
Miljkovic et al.

(10) Number: US 7,754,263 C1
(45) Certificate Issued: Jul. 25, 2013

(54) METHODS FOR COFFEE CHERRY PRODUCTS

(75) Inventors: Dusan Miljkovic, San Diego, CA (US); Brad Duell, Kailua Kona, HI (US); Vukosava Miljkovic, San Diego, CA (US)

(73) Assignee: VDF FutureCeuticals, Inc., Momence, IL (US)

Reexamination Request:
No. 90/011,990, Oct. 31, 2011

Reexamination Certificate for:
Patent No.: 7,754,263
Issued: Jul. 13, 2010
Appl. No.: 12/640,412
Filed: Dec. 17, 2009

Related U.S. Application Data

(62) Division of application No. 10/552,944, filed as application No. PCT/US03/11951 on Apr. 16, 2003, now Pat. No. 7,807,205.

(51) Int. Cl.
*A23F 5/00* (2006.01)
*A23F 3/00* (2006.01)

(52) U.S. Cl.
USPC ........... 426/427; 426/429; 426/432; 426/594; 426/595; 426/596; 426/597

(58) Field of Classification Search
None
See application file for complete search history.

(56) References Cited

To view the complete listing of prior art documents cited during the proceeding for Reexamination Control Number 90/011,990, please refer to the USPTO's public Patent Application Information Retrieval (PAIR) system under the Display References tab.

*Primary Examiner* — Sharon Turner

(57) ABSTRACT

Methods are provided for isolating a nutrient from coffee cherries or for producing a food product that comprises a coffee cherry or portion thereof. It is particularly preferred that coffee cherries will have an extremely low concentration of mycotoxins, including various aflatoxins, fumonisins, ochratoxins, and/or vomitoxin (DON, deoxynivalenol).

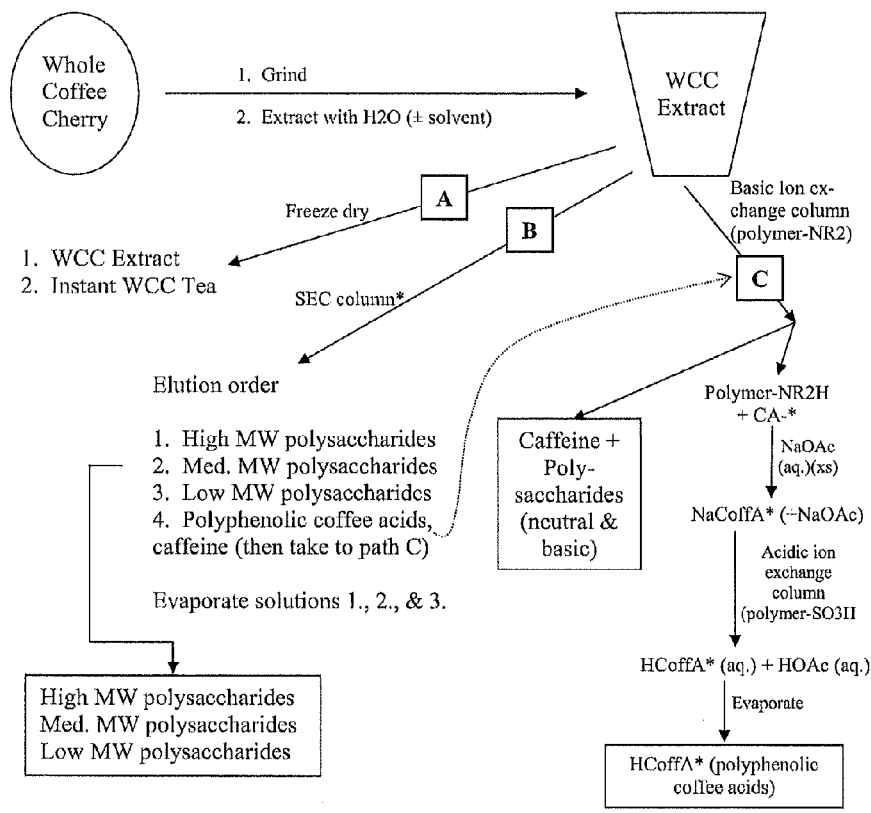

* SEC = size exclusion chromatography; HCoffA = coffee polyphenolic acids; CoffA- = coffee polyphenolic acids anion

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13-16 is confirmed.

Claims 1 and 17 are determined to be patentable as amended.

Claims 2-12 and 18-19, dependent on an amended claim, are determined to be patentable.

1. A method of producing a food product, comprising:
   adding an extract of whole coffee cherries to a food product for human consumption;
   wherein the extract is prepared from comminuting whole coffee cherries and solvent extraction of the comminuted coffee cherries with an aqueous solvent; and
   *wherein the whole coffee cherries have less than 20 ppb total aflatoxins, less than 5 ppb total ochratoxins, and less than 5 ppm total fumonisins;*
   wherein the coffee cherries are optionally quick-dried within 48 hours after harvest to a residual water content of equal or less than 20 wt %.

17. A method of producing a powder or extract for use in combination with a food product for human use, comprising:
    harvesting a plurality of whole coffee cherries;
    processing the whole coffee cherries to form the powder or extract by either
    [(b)] (*a*) comminuting the whole coffee cherries, extracting the comminuted whole coffee cherries with an aqueous solvent to form an aqueous extract, and at least partially dehydrating the aqueous extract, *wherein the whole coffee cherries exhibit mycotoxin levels that are below 20 ppb for total aflatoxins, below 5 ppm for total fumonisins, below 5 ppm for total vomitoxins, and below 5 ppb for ochratoxins;* or
    [(c)] (*b*) dehydrating and comminuting the whole coffee cherries, wherein the whole coffee cherries are dried under a protocol that limits microbial growth to an extent such that the dried coffee cherry exhibits mycotoxin levels that are below 20 ppb for total aflatoxins, below 5 ppm for total fumonisins, below 5 ppm for total vomitoxins, and below 5 ppb for ochratoxins, extracting the dehydrated and comminuted coffee cherries with an aqueous solvent to form an aqueous extract, and at least partially dehydrating the aqueous extract.

* * * * *